UNITED STATES PATENT OFFICE.

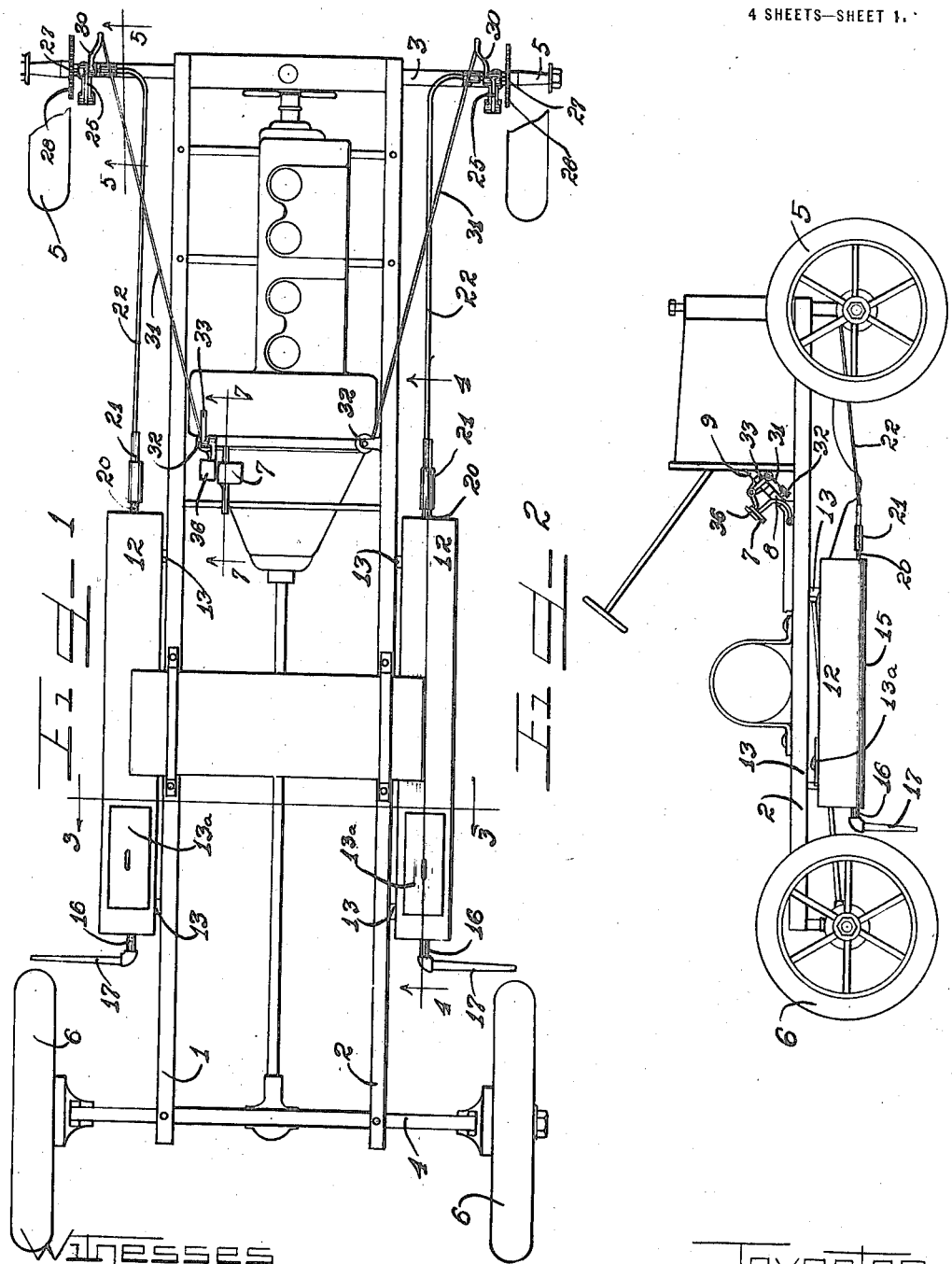

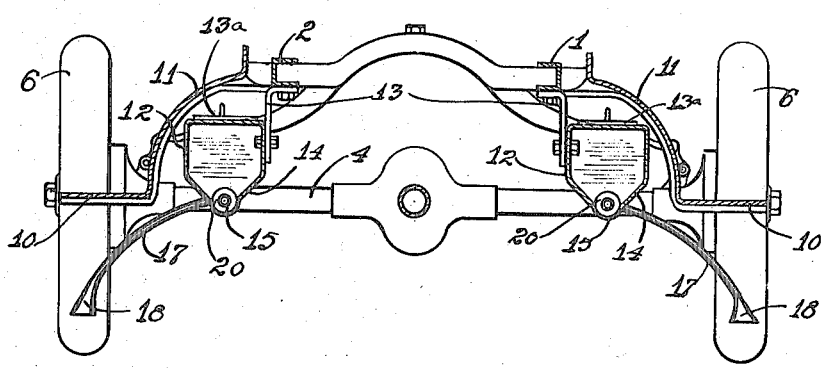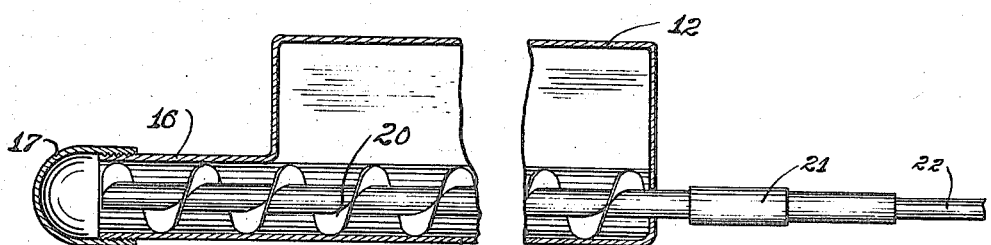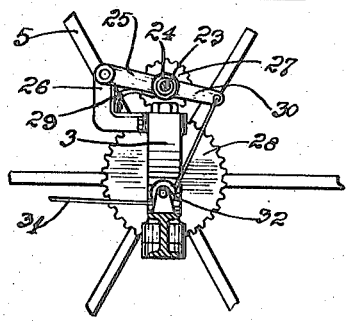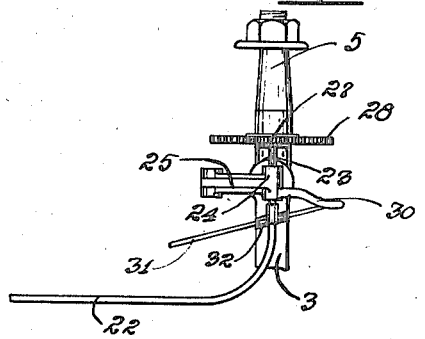

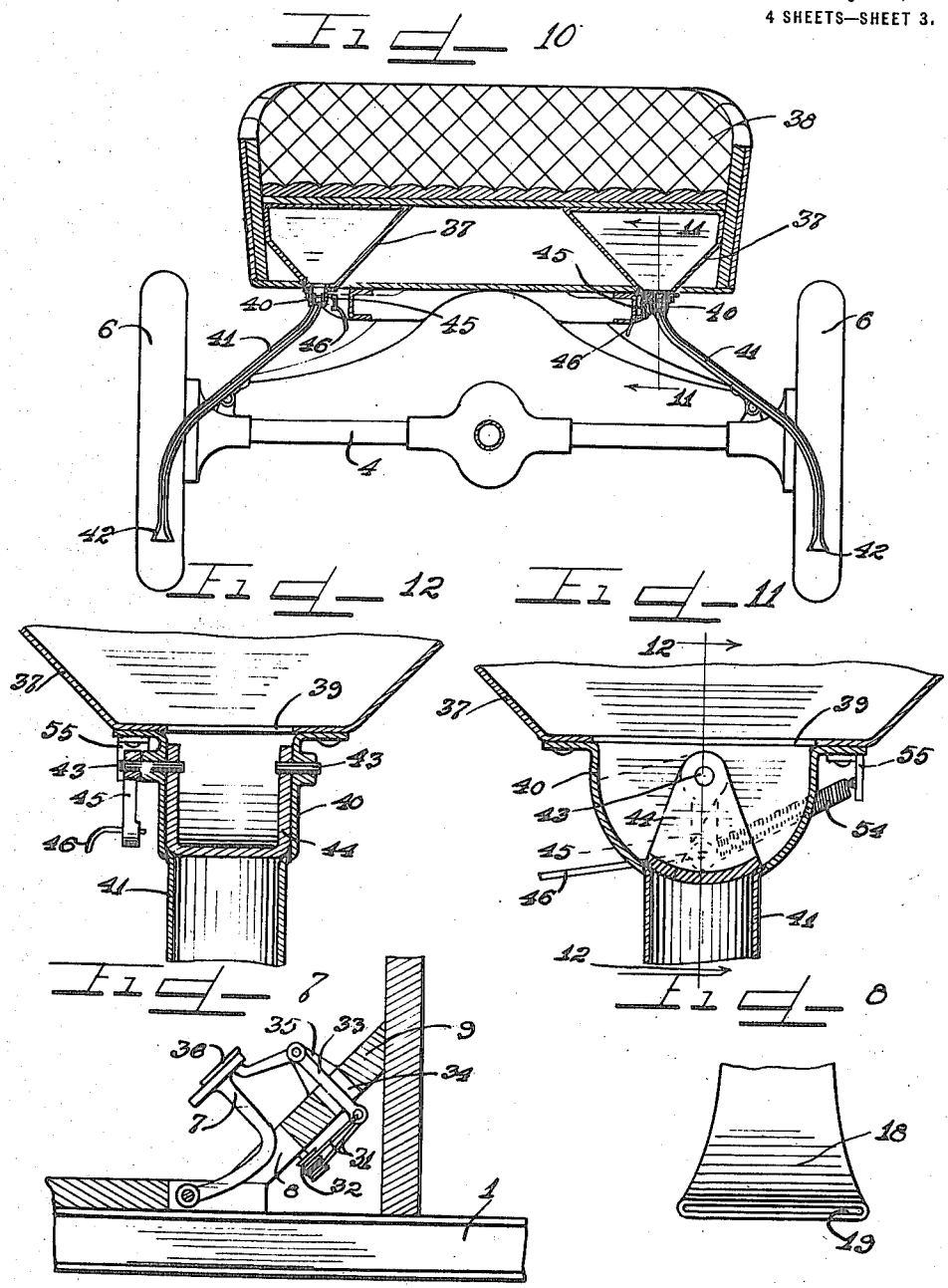

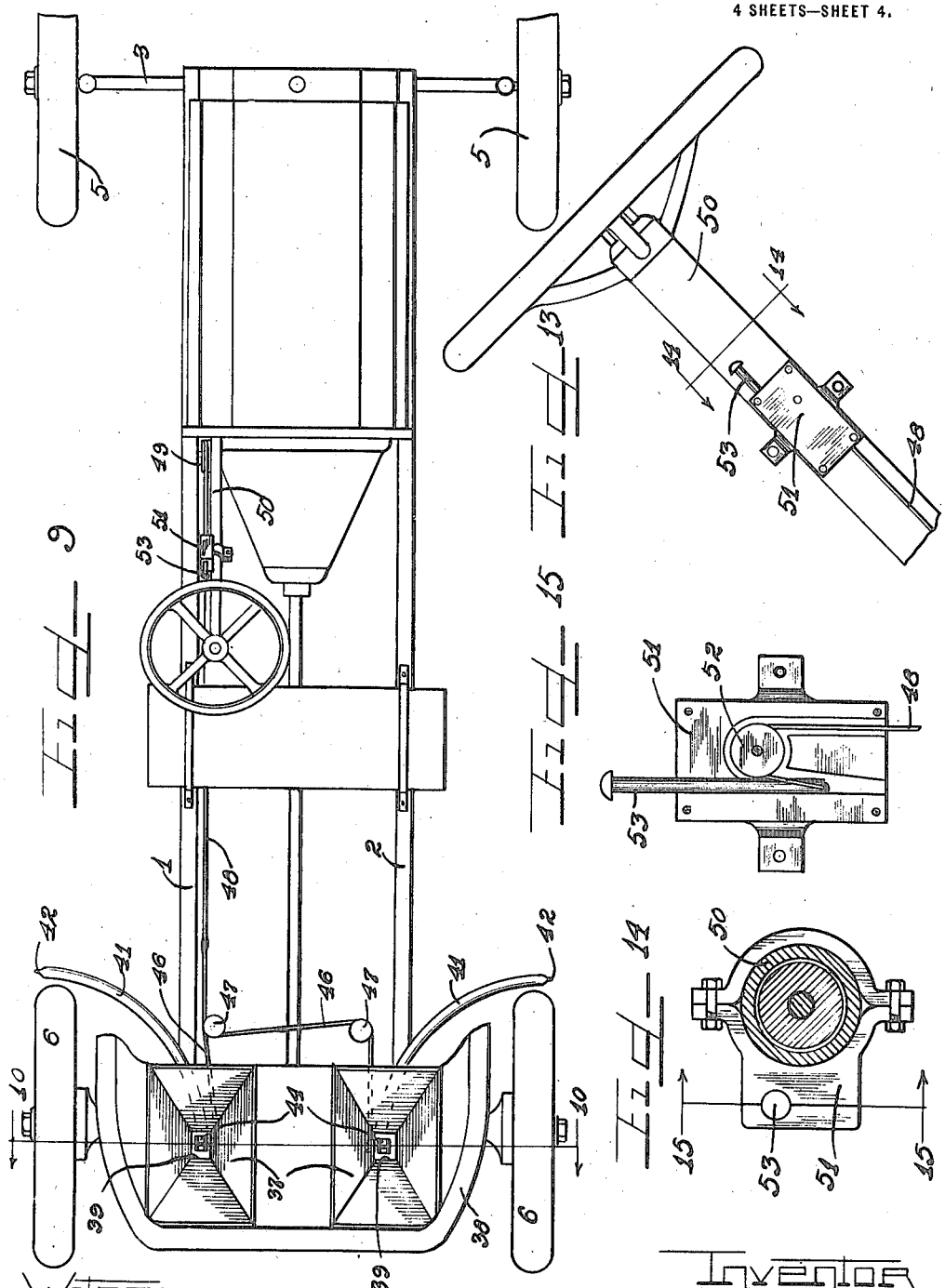

DAVID KUPFER, OF CHICAGO, ILLINOIS.

ANTISKID-SANDER FOR VEHICLES.

1,268,019.    Specification of Letters Patent.    Patented May 28, 1918.

Application filed June 28, 1917. Serial No. 177,449.

*To all whom it may concern:*

Be it known that I, DAVID KUPFER, a citizen of the United States, and a resident of the city of Chicago, in the county of Cook and State of Illinois, have invented certain new and useful Improvements in Antiskid-Sanders for Vehicles; and I do hereby declare that the following is a full, clear, and exact description of the same, reference being had to the accompanying drawings, and to the numerals of reference marked thereon, which form a part of this specification.

This invention relates to an improved form of anti-skidding device adapted for use on automobiles and other vehicles, and embraces mechanisms mounted upon the chassis of the vehicle and adapted to be operated to permit sand from sand containers mounted upon the car to issue through suitable spouts disposed to permit the sand to be spread on the ground before the rear wheels of the vehicle to prevent skidding of the vehicle when it is desired to bring the same to a sudden stop.

It is an object of this invention to provide a device for vehicles adapted to spread sand before the rear wheels thereof to prevent skidding.

It is also an object of this invention to construct a device for use on a vehicle adapted to be operated to spread sand before the rear wheels of the vehicle to prevent skidding when the brakes of the vehicle are suddenly applied.

It is a further object of this invention to construct an anti-skidding device for an automobile in which a sand feed mechanism is operatively connected with the front wheels of the automobile and adapted to be readily actuated by suitable means disposed within easy reach of the driver of the automobile to spread sand before the rear wheels of the automobile to prevent skidding.

It is furthermore an object of this invention to provide an anti-skidding device for an automobile embracing sand containers secured to the automobile and having means therein adapted to be actuated by mechanisms mounted in the front end of the automobile to throw sand before the rear wheels.

It is an important object of this invention to provide a sand spreading device of simple and effective construction adapted for use on vehicles to prevent skidding thereof when the spreading devices of the vehicles are actuated.

Other and further important objects of this invention will be apparent from the disclosures in the drawings and specification.

The invention (in a preferred form) is illustrated in the drawings, and hereinafter more fully described.

On the drawings:

Figure 1 is a top plan view of an automobile chassis equipped with an anti-skid sander embodying the principles of this invention.

Fig. 2 is a reduced side view thereof.

Fig. 3 is a section taken on line 3—3, of Fig. 1.

Fig. 4 is an enlarged section taken on line 4—4, of Fig. 1, showing parts broken away and parts in elevation.

Fig. 5 is an enlarged view taken on line 5—5, of Fig. 1.

Fig. 6 is a top plan view thereof.

Fig. 7 is an enlarged section taken on line 7—7, of Fig. 1, with parts shown in elevation.

Fig. 8, is a fragmentary view of the nozzle end of one of the sand spreaders.

Fig. 9 is a top plan view of an automobile chassis equipped with a modified form of the device.

Fig. 10 is a section taken on line 10—10, of Fig. 9, with parts shown in elevation.

Fig. 11 is an enlarged section taken on line 11—11, of Fig. 10.

Fig. 12 is a section taken on line 12—12, of Fig. 11.

Fig. 13 is an enlarged side elevational view of the steering post and wheel showing the means for operating the device mounted on the steering post.

Fig. 14 is an enlarged section taken on line 14—14, of Fig. 13.

Fig. 15 is a view taken on line 15—15, of Fig. 14.

As shown on the drawings:

The reference numerals 1 and 2, designate the longitudinal beams of an automobile chassis. The ends of said beams are supported upon a front axle 3, and a rear axle 4. Rotatably mounted upon each end of the front axle 3, is a front wheel 5, and secured to the ends of the rear axle 4, are rear driving wheels 6. Pivotally supported in the customary place at the front end of the automobile is the foot brake pedal 7, of the automobile, which when depressed projects through a suitable opening 8, in a foot board 9. Secured upon each side of the automobile is a running-board 10, having a running-board dash or apron 11, secured thereto and to the automobile frame, as shown in Fig. 3.

The anti-skid device or sand spreader embodying the principles of this invention comprises two long sand boxes, containers, or reservoirs 12, one of which is rigidly supported by means of brackets 13, below and to the outside of each of the chassis beams 1 and 2, and to the inside of the running-boards 10, behind the running-board dashes 11. Each of the sand boxes is provided with a removable cover 13$^a$, to permit filling of the boxes with sand. The lower portions of the sides of each of the sand boxes 12, are bent inwardly as denoted by the reference numeral 14, and are connected together by an integral semi-cylindrical trough 15. Integrally formed on the lower rear end of each of the boxes 12, and axially alined with the troughs 15, is a short cylindrical extension 16, the outer end of which is externally threaded to receive the upper end of an elbowed outlet pipe 17, threaded thereon. Each of the outlet pipes 17, is curved to extend outwardly to a point in front of one of the rear wheels 6, and has the lower end thereof flattened to form a nozzle or spout 18, having a long narrow mouth or slot 19, adapted to spread or sprinkle sand which passes there through in front of the rear wheels 6, as hereinafter described.

Rotatably mounted in each of the sand box troughs 15, and projecting into the cylindrical extensions 16, is a longitudinally disposed worm shaft 20, the front end of which projects through the front end wall of the respective boxes. Connected to the front end of each of the worm shafts 20, by means of a coupling 21, is the rear end of a flexible shaft 22, which extends longitudinally of the automobile and has its front end curved to connect with a stub shaft 23, disposed above and parallel to the front axle 3. Each of the stub shafts 23, is rotatably journaled in a head 24, of a lever 25, pivotally mounted upon a right angle bracket 26, secured upon the end of the front axle 3, and to the rear thereof. Rigidly secured upon the outer end of each of the stub shafts 23, to rotate therewith, is a small gear or pinion 27, adapted to mesh with a large gear 28, one of which is secured on the inner end of each of the hubs of the front wheels. To normally hold the pinions 27, out of engagement with the gears 28, a leaf spring 29, is secured to each of the brackets 26, below the levers 25, as shown in Fig. 5.

Integrally formed on each of the lever heads 24, opposite to the levers 25, is an arm 30, having an aperture in the end thereof to permit one end of a cord or cable 31, to be secured thereto. Each of the cables 31, engage a series of pulleys 32, conveniently spaced on the chassis of the automobile to permit the other or rear end of each of the cables 31, to be secured to the apertured inner or lower end of a rocker arm 33, which projects through a suitable opening 34, in the foot board 9, and has its upper or outer end pivotally mounted upon a bracket 35, secured on the upper surface of said foot board. Integrally secured on the upper end of the rocker arm 33, and at an angle thereto is a foot pedal 36, positioned adjacent the foot brake pedal 7, as clearly shown in Figs. 1 and 7, in which position the action of the leaf springs 29, hold the levers 25, in their upper position with the pinions 27, raised out of engagement with the large gears 28.

In the modified form of the device shown in Figs. 9 to 15, inclusive, two funnel shaped sand boxes or containers 37, are positioned underneath the rear seat 38, of the automobile, and are provided with outlet openings 39, at the lower ends thereof. Rigidly secured to the lower end of each of the sand boxes 37, is a trap or cup 40, on the lower end of which is integrally formed or rigidly secured by any suitable means an outlet pipe 41, which is curved to extend outwardly to a point in front of one of the rear wheels 6. The lower end of each of the outlet pipes 41, is flattened to form a nozzle or spout 42, having a long narrow mouth or slot in the end thereof adapted to spread or sprinkle sand in front of the rear wheels 6, as hereinafter described.

Pivotally mounted within each of the cups 40, upon pins 43, is a shutter or valve member 44, which is rigidly secured to said pins and is adapted to control the opening into the outlet pipes 41. The pins 43, are of different lengths and are rotatably journaled in suitable bearings provided for the purpose on the cups 40. The longer one of the pins 43, journaled in each cup projects through and beyond the outer end of its bearing and has keyed or secured by other suitable means on the outer end thereof one end of a lever arm 45, the other end of which is apertured to permit one end of a cord or cable 46, to be secured thereto. The cables 46 are engaged over pulleys 47, conveniently mounted on the automobile, and have the ends thereof connected to a common cord or cable 48, which is led forwardly and passes around a pulley 49, mounted near the front end of the chassis to the outside of the foot of the steering post 50, of the automobile. From the pulley 49, the cable is led upwardly along the steering post 50, and passes into a small box or casing 51, removably clamped on the steering post near the upper end thereof. Rotatably mounted within the casing 51, is a small pulley 52, over which the cable 48, is engaged. The end of the cable 48, is secured to the inner end of a push bolt or actuating handle 53, which is slidably engaged in the casing 51, and has the upper end thereof projecting through the top of the casing to permit the same to be actuated to operate the sand spreader mechanisms when desired.

The valve 44, in each cup is automatically closed upon release of the push bolt 53, by means of a spring 54, one end of which is secured to the lever arm 45, and the other end of which is secured to a bracket 55, one of which is mounted upon each of the sand boxes.

The operation is as follows:

In the form of the device shown in Figs. 1 to 8, inclusive, the sand boxes 12, are filled with dry sand. Under normal operating conditions of the device the foot pedal 36, is in its upper or raised position with the controlling springs 29, holding the levers 25, in their upper position thereby also holding the pinions 27, out of engagement with the large driving gears 28, which are mounted to rotate with the front wheels 5, of the automobile. If, when the automobile is running, it begins to skid or it becomes necessary to suddenly bring the same to a halt upon a wet slippery road or pavement the foot pedal 36, is depressed either simultaneously with or independently of the foot brake pedal 7, of the automobile, thereby operating the rocker arm 33, the inner end of which swings upwardly tensioning the cables 31, attached thereto. The pull exerted upon the cables 31, draws the levers 25, downwardly against the action of the leaf springs 29, thereby throwing the pinions 27, into mesh with the gears 28. With the rotation of the pinions 27, the flexible shafts 22, are rotated and transmit a rotary motion to the worm shafts 20, which are longitudinally disposed in the troughs 15, of the sand boxes 12. The action of the worm shafts 20, forces the dry sand through the extensions 16, into the outlet pipes 17, and out through the nozzles 18, the mouths 19, of which are so shaped to spread or sprinkle the dry sand on the road directly before each of the rear wheels 6, of the automobile thereby affording a gripping surface for the tires and preventing skidding of the automobile. It will be noted that the device operates only when the front wheels rotate and when the foot pedal 36, is depressed. When the foot pedal 36, is released the action of the controlling springs 29, forces the levers 25, upwardly thereby disengaging the pinions 27, from the gears 28, and stopping the rotary action of the worm shafts. Of course, if at any time the non-skid sander is not required and it is desired to stop the automobile the foot brake pedal 7, may be depressed without actuating the foot pedal 36, mounted adjacent thereto or in any other convenient position, thus permitting the automobile to be stopped without spreading sand.

In the modified form of the device shown in Figs. 9 to 15, inclusive, the sand boxes 37, are filled with dry sand through suitable openings in the top thereof, the valves 44, being in normal closed position as shown in Fig. 11. If during the running of the vehicle the same skids or it becomes necessary to suddenly stop the same on a wet slippery road or pavement, the push bolt 53, is depressed thereby tensioning the cable 48, and the cables 46, which in turn actuate the levers 45, thus moving the valves 44, to open the same. The dry sand from the sand boxes 37, by the action of gravity passes downwardly through the cups 40, into the outlet pipes 41, and out through the mouths of the nozzles 42, the shape of which tends to spread or sprinkle the sand upon the road directly in front of each of the rear wheels of the vehicle, thus affording gripping surfaces for the tires and preventing skidding of the vehicle.

The sprinkling of the sand continues only while the push bolt 53, is depressed. Upon release of the push bolt, the valve members 44, are drawn into closed position by the action of the springs 47, thereby shutting off the outward flow of sand.

It will of course be understood that the sand spreader mechanisms may be operated by any other suitable means conveniently positioned on the vehicle, and that if desired the actuating cables may be attached to the foot brake pedal 7, of the vehicle instead of to a separate pedal. I am also aware that various other details of construction may be varied through a wide range without departing from the principles of this invention, and I therefore do not purpose limiting the patent granted otherwise than necessitated by the prior art.

I claim as my invention:

1. The combination with a vehicle, of sand spreader means mounted thereon, and means connected therewith and with the front wheels of the vehicle adapted to actuate the same to sprinkle sand in front of the rear wheels of the vehicle to prevent skidding thereof.

2. In a device of the class described the combination with an automobile, of sand containers mounted on said automobile, means movably disposed within said containers, mechanisms associated with the front wheels of the automobile and connected with said means adapted when operated to actuate said means to sprinkle sand before the rear wheels of the automobile to hold the same from skidding, and means connected with said mechanisms adapted to return the same to normal position to stop the spreading of sand.

3. In a device of the class described adapted for use on an automobile, a sand container, a spreader nozzle connected therewith disposed before one of the rear wheels of the automobile, means rotatably disposed within said container, a gear mechanism connected therewith associated with one of the front wheels of the automobile, and means connected therewith adapted to be actuated to operate said gear mechanism and said rotatable means to force sand through said spreader nozzle before said rear wheel to hold the same against skidding.

4. In a device of the class described the combination with an automobile, of sand boxes secured on said automobile, spreader means connected therewith disposed in front of the rear wheels of said automobile, feeder means disposed within said sand boxes, gears mounted on the front wheels of said automobile rotatable therewith, spring controlled pinion means mounted on the front axle of the automobile normally out of mesh with said gears, flexible means connected between said feeder means and said pinion means, and mechanisms connecting said pinion means to move said pinion means into mesh with said gears to rotate said flexible means and said feeder means to force sand out of said spreader means before the rear wheels of the automobile to hold the same from skidding.

5. In an anti-skid device of the class described adapted to be attached to a vehicle, sand feeding means, and means connected therewith adapted to be actuated by the front wheels of the vehicle to operate said feeding means to spread sand before the rear wheels of the vehicle.

6. In a device of the class described the combination with a vehicle, of sand container means secured on the sides of said vehicle, spring controlled gear mechanisms associated with the front wheels of the vehicle, controlling means disposed to be manually actuated, flexible means connecting said container means and said gear mechanisms, and cables connecting said gear mechanisms and said controlling means adapted to be tensioned when the vehicle is in motion and said controlling means is depressed to actuate said gear mechanisms and said sand container means to spread sand before the rear wheels of the vehicle to hold the same from skidding.

In testimony whereof I have hereunto subscribed my name in the presence of two subscribing witnesses.

DAVID KUPFER.

Witnesses:
 LAWRENCE REIBSTEIN,
 EARL M. HARDINE.